Sept. 4, 1951 B. W. WHEELIS 2,566,785
CRANKSHAFT CONSTRUCTION
Filed Aug. 16, 1946
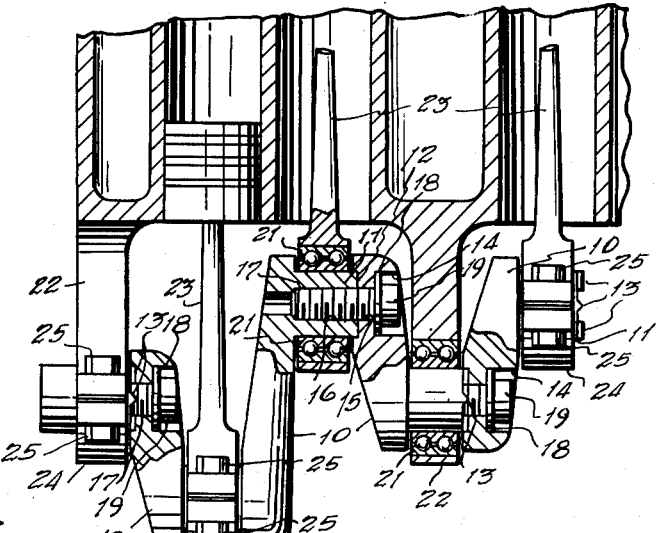
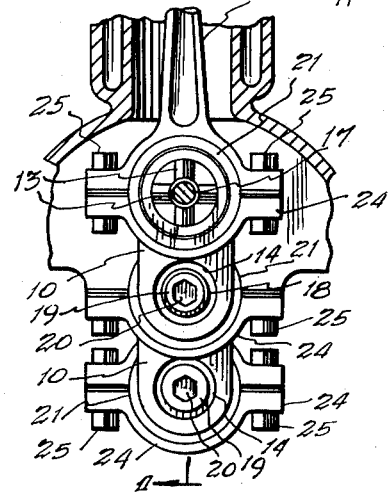
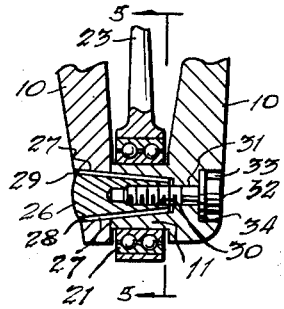
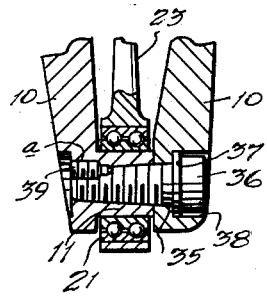
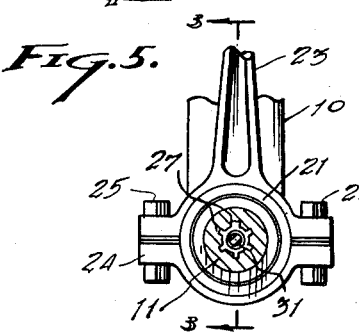
BEN W. WHEELIS
INVENTOR.
BY
ATTORNEY Patented Sept. 4, 1951

2,566,785

UNITED STATES PATENT OFFICE 2,566,785

CRANKSHAFT CONSTRUCTION

Ben W. Wheelis, Killeen, Tex.

Application August 16, 1946, Serial No. 690,915

2 Claims. (Cl. 74—597)

This invention relates to internal combustion engines and it has particular reference to crankshafts especially designed for multiple cylinder engines, and its principal object resides in the provision of a crankshaft structure capable of being dismantled in order that non-friction bearings can be employed in the main shaft supports and connecting rods thus providing an arrangement which affords longer lasting and more durable parts than the conventional type of Babbitt bearings of the friction type.

Another object of the invention is manifest in the provision of a crankshaft assembly which, although capable of being dismantled, has embodied therein features of construction which insure its proper re-assembling by persons of ordinary skill after the assembly has been taken apart for the purpose of changing or inspecting the bearings and without improper alignment of the crank arms and pins resulting in impairing the function of the motor and the timing of the pistons.

Broadly, the invention seeks to comprehend the provision of a crankshaft construction for internal combustion engines in which each of the crank pins are capable of ready access in order that the bearings may be replaced or inspected individually and providing a structure which is capable of reducing the cost of operation of the motor as well as minimizing the cost of repairs and the necessity for removing the entire crankshaft from the motor when it becomes expedient to replace or repair any of the crank arms or pins and in which bearings may be replaced readily and without difficulty.

While the foregoing objects are paramount, other and lesser objects will become manifest as the description proceeds, taken in connection with the appended drawings, wherein:

Figure 1 is a fragmentary vertical section, taken on lines 1—1 of Figure 2, illustrating the invention installed in a multiple cylinder motor, showing connecting rod and support bearings for the crankshaft.

Figure 2 is a fragmentary end view of the crankshaft, illustrating the motor housing in transverse vertical section and showing one form of aligning means for the crankshaft pin when the same is assembled.

Figure 3 fragmentarily illustrates another form of the invention showing the coupling means between the crank arms through the crank pin and illustrating a connecting rod bearing, the illustration being taken on lines 3—3 of Figure 5.

Figure 4 is another fragmentary vertical section taken on lines 4—4 of Figure 6, illustrating another form of connecting means between the crank arms through the crank pin and means for locking the said connecting arrangement.

Figure 5 fragmentarily illustrates a connecting rod bearing and showing the assembling device connecting the crank arms to the crank pin, shown in section and on lines 5—5 of Figure 3, and Figure 6 illustrates one of the crank arms in elevation and showing the end view of one of the crank pins, the assembly employing the connecting device of the invention shown in Figure 4.

The invention is designed to obviate the necessity for utilizing the conventional type of Babbitt bearings employed in internal combustion engines in supporting the crankshaft and for the connecting rods. It is well known that Babbitt bearings, while universally employed in internal combustion engines, particularly designed for automotive vehicles, require considerable lubrication and constant attention to preserve these members and prevent excessive wear. Heretofore no satisfactory provision has been made for the use of non-friction bearings which are obviously more satisfactory than the conventional Babbitt bearings. However, it has been impossible to utilize the non-friction type of bearings due to the fact that conventional crankshafts are constructed in one piece and the crank arms and pins are integral so that non-friction bearings, which are of necessity annular in form and are not made in sections, can not be installed. The invention affords a means whereby non-friction bearings can be employed in the main bearing support of the motor as well as for the connecting rods.

The invention contemplates the provision of a crankshaft structure having paired arrangement of crank arms 10 which are identical in design but oppositely arranged and detachably associated. Each of the arms 10 have the crank pins 11 integral therewith at one end while the opposite ends are formed with the radial arrangement of grooves or recesses 12 which are engageable by a similar arrangement of bosses 13 integral with the ends of the pins 11 when the arms 10 are associated in the manner illustrated in Figure 1. The ends of the arms 10 opposite the pins 11 are formed with circular recesses 14 and an interiorly threaded bore 15 which, when the arms are assembled registers with an interiorly threaded bore 16 arranged longitudinally through the pins 11 and case hardened bolts 17 are threaded through the bores 15 and 16, in the manner shown in Figure 1, their heads engaging washers 18 in the recesses 14. It is desirable that the heads 19 of the bolts 17 be provided with hexagonal recesses 20 of the Allen type.

While assembling the crankshaft in this manner the conventional non-friction bearings 21 may be arranged upon the pins 11 and the crank arms 10 connected together by the bolt 17 without removing the crankshaft from the motor. A bearing 21 may be thus installed at any station along the crankshaft without disturbing any of the other bearings, either in the connecting rod or the main bearing support 22. To insure proper alignment of the arms 10 in re-assembling the crankshaft, the bosses 13 must correspond to the radial recesses 12 in the opposite arm 10. When the bolt 17 is threaded up tight the crankshaft is rigidly assembled. Any of the connecting rods 23 may be removed at will in the conventional manner by removing the caps 24 which are retained by bolts 25. A similar arrangement is provided for the main bearing support 22.

In Figure 3 is illustrated a modified form of the invention in which the crank arms 10 are connected to the pin 11, in each crank assembly, by a conical plug 26 having an arrangement of splines 27 thereon. One of the splines 27, however, is preferably wider than the other and must be arranged in the wider of the corresponding grooves 28 arranged in the conically formed aperture 29 in the end of one of the arms 10 and the bore 30 in the pin 11 of the opposite arm 10. The conical member 26 has an interiorly threaded bore in its smaller end into which is threaded a bolt 31 which is arranged through the end of the crank arm 10 upon which the pin 11 is formed, the head 32 thereof entering an annular recess 33 and engaging a lock washer 34 therein. Obviously, by threading the bolts 31 inwardly into the conical member 26, the latter is drawn into the conical bore 30 of the pin 11 rigidly associating the arms 10.

In Figure 4 is illustrated another modified form of the invention in which the arms 10 are associated and rigidly secured by a conical bolt or stud 35 which is arranged through the apertured end of one of the crank arms 10 and threaded into the conical bore arranged longitudinally through the pin 11 of the opposite arm 10. The head 36 of the bolt 35 is threaded inwardly against a washer 37 into an annular recess 38. Both of the bolts 31 and 35 are preferably provided with hexagonal recesses 20, so that the conventional type of Allen wrench may be employed in operating the same. An internally threaded bore is provided in the crank arm 10 on which the integral pin 11 is arranged, half of which extends into the arm 10, at $a$ while the other half extends into the bolt 35, in the manner illustrated in Figure 6, so that when the bolt 35 is properly positioned and its half of the bore registers with that of the arm 10, a stud 39 can be threaded thereinto locking the bolt 35 against rotation. This arrangement is shown in greater detail in Figure 6.

It is apparent that a variety of modifications of the invention may be resorted to by persons skilled in the art without departing from the spirit and intent of the invention or the scope of the appended claims.

What is claimed is:

1. In a crankshaft construction in internal combustion motors, a set of paired detachably connected crank arms on said shaft, a hollow crank pin formed on one of each pair of said arms, a splined cone arranged in the end of each of the opposite arms of each pair and extending into said crank pin thereof detachably and rigidly securing each pair of said arms through said pins, and a stud arranged through each pin and threaded into the said cones providing locking means for said cones.

2. In a crank shaft for internal combustion motors, a set of paired detachably connected crank arms on said shaft, means integral with one of each pair of said arms providing a crank pin, a splined conically formed aperture in the opposite arm, a conical plug in said aperture extending into said crank pin, and a threaded stud threaded through said crank pin and into said plug, rigidly connecting said arms and locking same in detachable association.

BEN W. WHEELIS.

REFERENCES CITED

The following references are of record in the file of this patent:

UNITED STATES PATENTS

| Number | Name | Date |
| --- | --- | --- |
| 306,666 | Watkins | Oct. 14, 1884 |
| 1,186,749 | Cobb | June 13, 1916 |
| 1,988,830 | Brickwalter | Jan. 22, 1935 |
| 2,109,526 | Fell | Mar. 1, 1938 |
| 2,190,411 | Mattison | Feb. 13, 1940 |
| 2,288,651 | Ruist et al. | July 7, 1942 |
| 2,471,982 | Shulda | May 31, 1949 |

FOREIGN PATENTS

| Number | Country | Date |
| --- | --- | --- |
| 544,025 | France | June 14, 1922 |
| 666,539 | Germany | Oct. 22, 1938 |